US007321984B2

(12) United States Patent
Fu

(10) Patent No.: US 7,321,984 B2
(45) Date of Patent: Jan. 22, 2008

(54) AUTOMATIC STORAGE UNIT IN SMART HOME

(75) Inventor: Zhen Fu, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 628 days.

(21) Appl. No.: 10/884,452

(22) Filed: Jul. 2, 2004

(65) Prior Publication Data

US 2006/0005071 A1 Jan. 5, 2006

(51) Int. Cl.
*G06F 11/00* (2006.01)

(52) U.S. Cl. .......................................................... 714/5

(58) Field of Classification Search .................... 714/5, 714/39, 46, 43

See application file for complete search history.

(56) References Cited

U.S. PATENT DOCUMENTS

| | | | | |
|---|---|---|---|---|
| 4,389,157 | A * | 6/1983 | Bernard et al. | 414/787 |
| 5,018,926 | A * | 5/1991 | Sternad | 414/253 |
| 5,337,880 | A * | 8/1994 | Claycomb et al. | 198/347.3 |
| 5,362,197 | A * | 11/1994 | Rigling | 414/807 |
| 5,645,173 | A | 7/1997 | Taylor et al. | 211/1.56 |
| 5,850,222 | A | 12/1998 | Cone | 345/418 |
| 5,915,909 | A * | 6/1999 | Smith | 414/280 |
| 7,133,743 | B2 * | 11/2006 | Tilles et al. | 700/242 |
| 2001/0026272 | A1 | 10/2001 | Feld et al. | 345/419 |
| 2002/0045959 | A1 | 4/2002 | Van Overveld | 700/90 |
| 2002/0121980 | A1 | 9/2002 | Wan et al. | 340/572.1 |

FOREIGN PATENT DOCUMENTS

| | | |
|---|---|---|
| CN | 1208791 | 2/1999 |
| DE | 3735607 | 5/1989 |

OTHER PUBLICATIONS

"Welcome to Caroline's Closets.com", http://www-scf/usc/edu/~csouders/index.htm, Caroline's Closets.com Web Page, p. 1 of 1.

http://www-scf.usc.edu/~csouders/mission.htm, Mission, Caroline's Closets.com, p. 1 of 1.

http://www-scf/usc/edu/~csouders/products.htm, Our Products, Caroline's Closets.com, p. 1 of 1.

"Magic Wardrobe, The Dry Cleaner That Never Closes", http://www.magicwardrobe.com/technical.html, The Magic Wardrobe—Amazing Cleaning Automation, Technical Information, p. 1 of 1.

"Magic Wardrobe, The Dry Cleaner That Never Closes", http://www.magicwardrobe.com/works.html, The Magic Wardrobe—Amazing Cleaning Automation, How it Works, pp. 1-3.

(Continued)

*Primary Examiner*—Nadeem Iqbal
(74) *Attorney, Agent, or Firm*—Duke W. Yee; A. Bruce Clay; Lisa L.B. Yociss

(57) ABSTRACT

A method, system, and device for computer control of access to a storage unit. The computer monitors the physical environment inside the storage unit, assists in placing and retrieving desired articles of clothing, and provides a method of visualizing possible ensembles without the need to physically pull out the individual items. Remote access to the database is provided and optional voice control for blind users.

29 Claims, 5 Drawing Sheets

OTHER PUBLICATIONS

"Magic Wardrobe, The Dry Cleaner That Never Closes", http://www.magicwardrobe.com/system.html, The Magic Wardrobe—Amazing Cleaning Automation, System Information, pp. 1-2.

"Magic Wardrobe, The Dry Cleaner That Never Closes", http://www.magicwardrobe.com/company.html, The Magic Wardrobe—Amazing Cleaning Automation, Corporate Information, p. 1 of 1.

"Magic Wardrobe, The Dry Cleaner That Never Closes", http://www.magicwardrobe.com/index.html, The Magic Wardrobe—Amazing Cleaning Automation, Magic Wardrobe, pp. 1-2.

* cited by examiner

AUTOMATIC STORAGE UNIT IN SMART HOME

BACKGROUND OF THE INVENTION

1. Technical Field

The present invention relates generally to controlling household elements though the use of computers. More specifically, the present invention relates to maintaining a clothes storage unit using computer control in placing and retrieving clothes, in assembling complete ensembles, and in maintaining a proper environment inside the storage unit.

2. Description of Related Art

In many developed countries, individuals may own many pieces of clothing, with any one article being appropriate for some situations but not for others. For example, a person who maintains a large storage unit may have different clothing for work, leisure, and dressy occasions, such as a wedding or special dance. The weight and style of the clothing or its decoration can make it appropriate for only certain seasons or specific holidays. There may also be accessories, such as shoes, scarves, hats, belts, etc. that are used with various outfits.

Many people do not organize their clothing and accessories well, which makes it difficult for them to find items when necessary. They may also forget items that they own or buy additional clothes simply because they cannot locate what they do own. A disorganized person can spend a lot of time trying to decide what to wear, pulling out clothes and putting them back if they are not suitable. A person with disabilities, such as blindness, may need help in keeping their clothes organized. Persons who travel a lot or on short notice sometime wish they could perform some of the planning for packing from another location than home.

Additionally, many storage units are entered from a bathroom, allowing moisture to enter the storage unit. If not controlled, this situation can cause mold and mildew to form, ruining clothing and accessories.

It would be desirable to have an automatic storage unit that could maintain clothes in an organized manner and that could display the contents of the storage unit in a manner that assists the user in choosing suitable clothing from a variety of locations.

SUMMARY OF THE INVENTION

This present invention discloses a method, system, and device for providing a storage facility for clothes, such as a storage unit, that is tied to computer control. The computer monitors the physical environment inside the storage unit, assists in placing and retrieving desired articles of clothing, and provides a method of visualizing possible ensembles without the need to physically pull out the individual items. The storage unit can also be remotely controlled so that, for example, a professional who is asked to make an unexpected trip can remotely access the home computer and have the desired clothing made available for packing.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Hardware

The physical hardware necessary for the automatic storage unit for clothes fall into two categories: (a) hardware that is used only by the automatic storage unit, depicted in FIG. 1A, and (b) hardware that is shared by other systems, depicted in FIG. 1B.

Figure 1A:
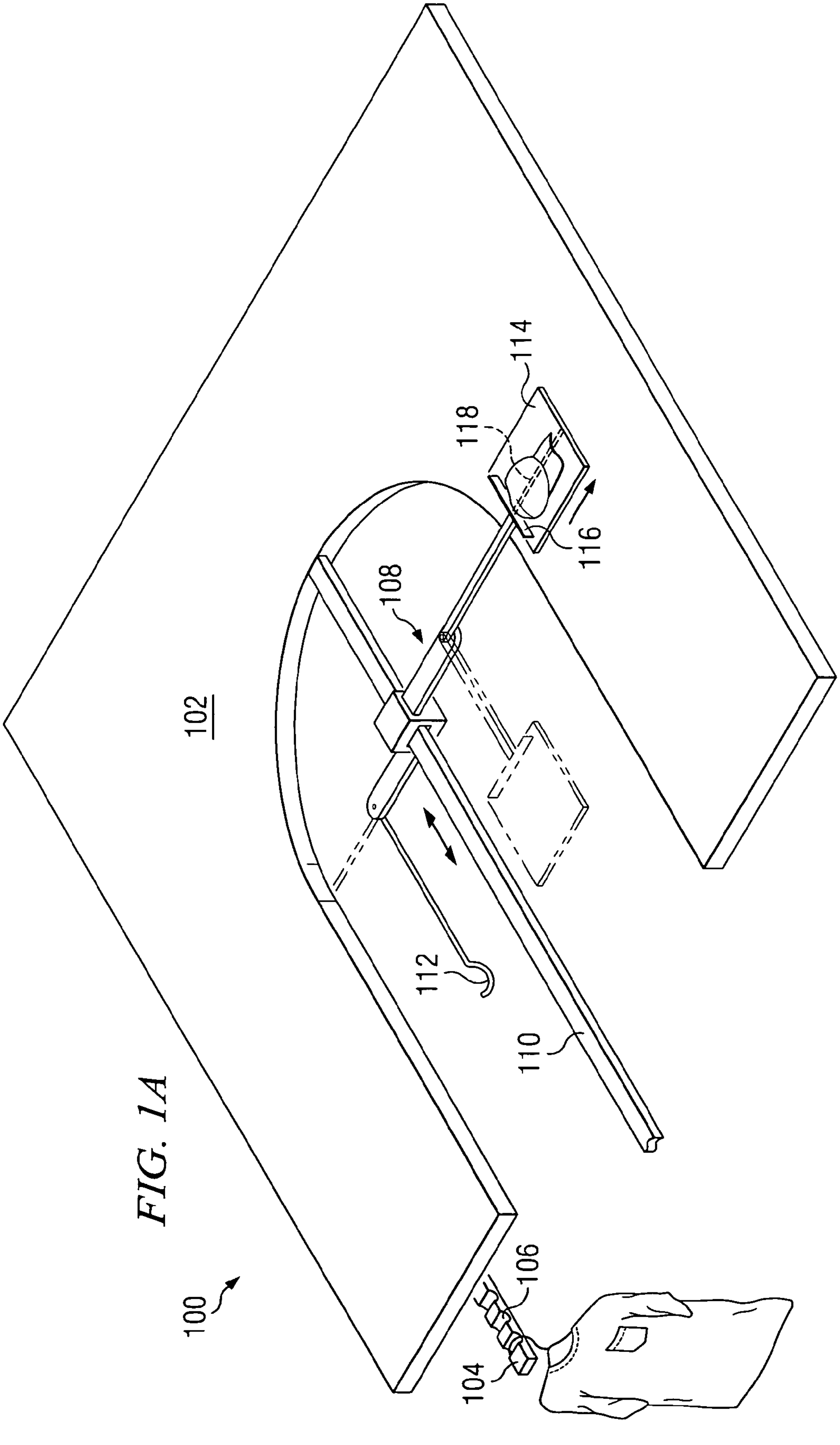
FIG. 1A shows the interior of a storage unit according to an exemplary embodiment of the invention.

FIG. 1A shows the interior of storage unit 100 in accordance with a preferred embodiment of the present invention. Shelf 102 extends around the perimeter of storage unit 100 and rod 104 runs beneath it for hanging clothes. In the presently preferred embodiment, rod 104 contains indentations 106 into which hangers can be placed. Enough distance separates adjacent indentations 106 that air can circulate around clothes hung on rod 104. A manipulator 108 moves along manipulator track 110 in order to carry clothing and accessories to and from storage locations. Manipulator track 110 terminates at a presentation area 111 where clothes can be picked up or placed by manipulator 108.

Presentation area 111 is preferably configured to hold a number of items, since there can be a need to remove or replace several items at a time, such as when packing for a trip. In at least some illustrative embodiments, presentation area 111 is a dead-end section of manipulator track 110. Manipulator 108 has two distinct sections in this example. First section 112 of manipulator 108 carries clothing on hangers to and from the storage unit. Second section 114 of manipulator 108 carries articles for shelf 102, such as hats or shoes. Push pad 116 normally sits at the back of second section 114, but can travel on track 118 to push articles off of second section 114 onto shelf 102 as necessary.

Figure 1B:
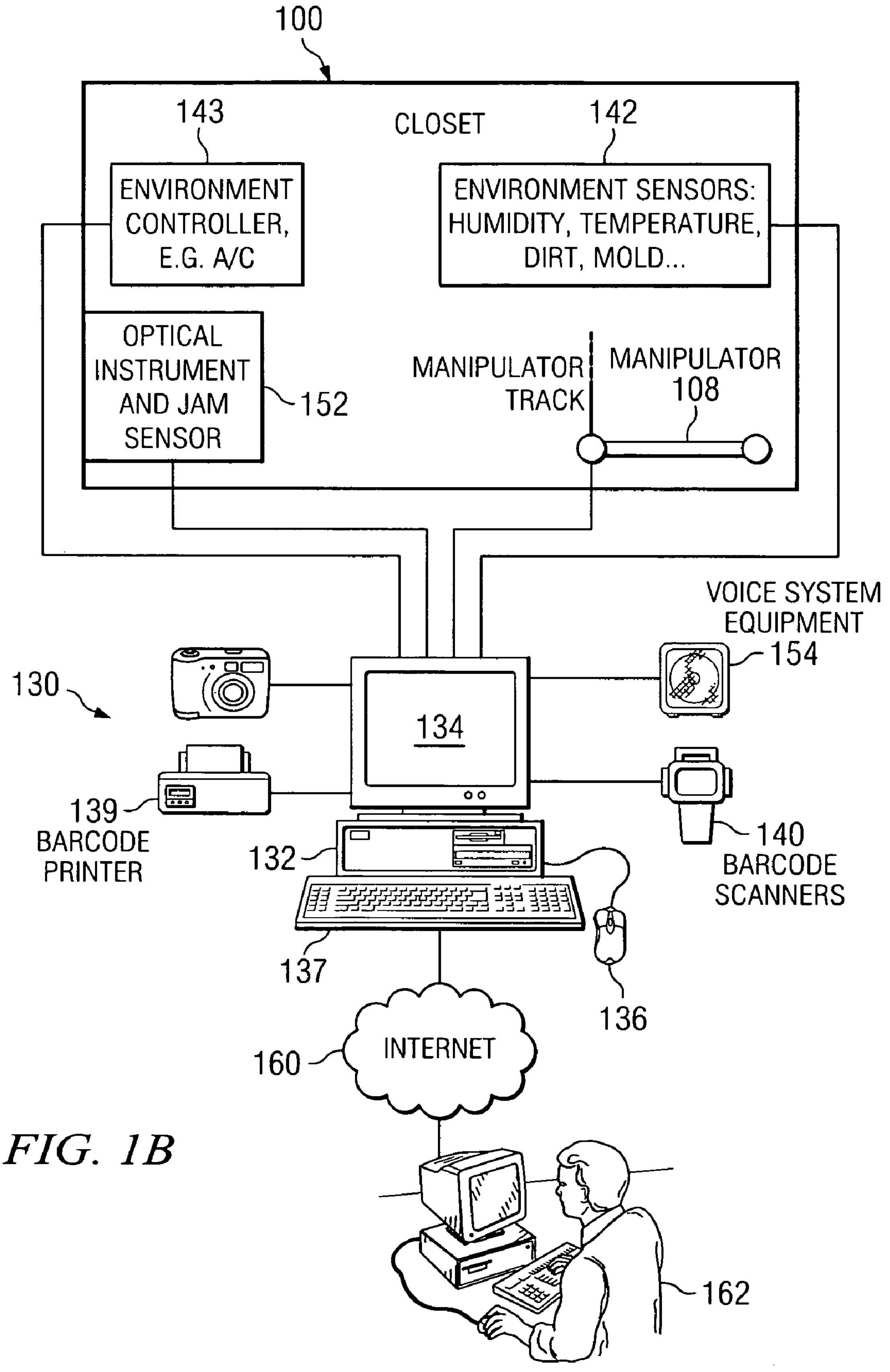
FIG. 1B depicts a computer system that controls a storage unit according to an exemplary embodiment of the invention.

FIG. 1B depicts computer system 130, which controls storage unit 100, as well as various accessories that are tied to the computer, in accordance with a preferred embodiment of the present invention. Computer system 130 contains a processor 132, monitor 134, mouse 136, and keyboard 137. Barcode scanner 138 is connected to processor 132 to read barcodes that identify articles and/or storage areas. A barcode printer 139 is used to provide permanent barcode labels for items. Camera 140 is preferably a digital camera with a direct interface to computer 132 for taking and storing pictures of the articles of clothing. In alternate embodiments, however, an analog camera can be used to take pictures, which are then processed to create digital pictures and input to computer 132. Sensors 142 are located in storage unit 100 to provide information regarding the conditions inside storage unit 100. In the illustrative embodiment, these sensors 142 are integral parts of a general system of sensors throughout a smart home.

In storage unit 100, it is desirable that sensors 142 include a temperature sensor, humidity sensor, mold sensor, and dirt sensor. These sensors are not required, but are preferably provided, as there is little need for humans to enter the storage unit and hence adverse conditions might not otherwise be detected for some time. As new sensor technology becomes available, the types of sensors 142 installed in smart storage unit also can increase. Environmental control system 143 provides ways to control the climate inside storage unit 100, such as air conditioning and humidity control. Optical system 152 is connected to computer 130 to provide a remote look into storage unit 100 and can be part of a house-wide system of optical monitoring. Optical system 152 should be mounted in such a manner that a view can be obtained of all areas of storage unit 100 without physically entering storage unit 100 and can be used to confirm a jam in storage unit 100 prior to entering storage unit 100. Finally, an optional microphone/speaker combination 154 tied to a voice recognition/voice synthesis system provides the capability to assist those who are unable to use the keyboard, such as the blind, by replacing visual commands and keyboard entry by voice commands and spoken prompts. System 130 is preferably connected to Internet 160 so that information regarding the home and storage unit can be accessed from remote locations 162 when necessary.

Software

Figure 2:
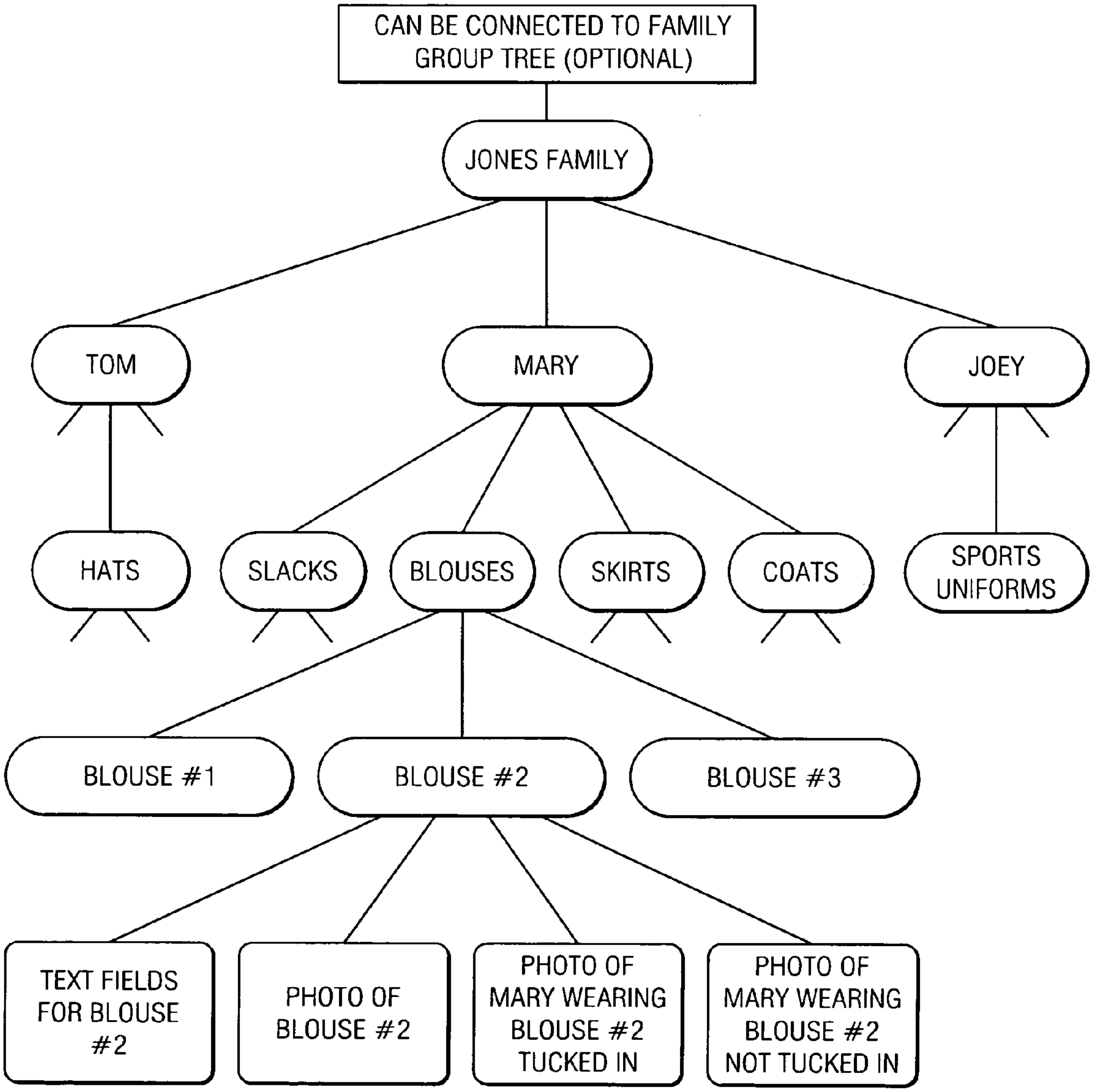
FIG. 2 discloses a representation of a portion of a tree structure for the storage unit of a family of three.

With reference now to FIG. 2, a representation of the clothing database for a family of three is shown in accordance with a preferred embodiment of the present invention. The information regarding the articles of clothing is organized in a rewriteable, expandable database. This database can be object-oriented or relationship-oriented. Based on the volume and cost, a system can include a small local database or a large, remote, central database. When the data volume is not large, as for family use, a local object database is preferred, such as Java database. Most data fields can be saved in text format, although pictures are stored in graphic format. In this illustrative example, each article of clothing is represented as a node on a tree, with each node containing both text information regarding the item and at least one picture of the garment.

The Jones family 210 consists of parents Tom 212 and Mary 214 and their child Joey 216, each of who form a node under their family node 210. Optionally, a number of families can share the resources of the database. In this case, the Jones family 210 is a node on a larger tree 200. The tree has been expanded more fully under Mary, so only her node will be discussed for purposes of describing the present invention. Of course, the nodes for other members of the family may have the same structure as that for Mary. Under Mary's node 214, four categories are shown, although there may, of course, be additional categories. In the depicted example, these categories are slacks 218, blouses 220, skirts 222, and coats 224. Again, for simplicity, the categories are expanded only under the category for blouses 220, which contains blouse #1 226, blouse #2 228 and blouse #3 230.

For each item of clothing, such as blouse #2 228, the database will hold a text description of the article and several photos. In the exemplary embodiment, there is a description of the blouse 231, a photo 232 of the blouse by itself, either hung on a hanger or spread out for viewing, a photo 234 of Mary wearing this blouse tucked into slacks or a skirt, and a photo 236 of Mary wearing this blouse left loose over pants or skirt.

Within the description 231 of the blouse, four mandatory fields and a number of optional fields that can be user defined are present. For this example, the mandatory fields are (a) the value of the bar code, which is used to identify the article of clothing, (b) the owner's name, so that the item can be displayed for the correct owner, (c) the category or type of clothing, such as skirt, coat, pants, hat, etc., and (d) the position in the storage unit where the item will be stored. In a preferred embodiment of the invention, the storage unit itself will be divided into zones by clothing categories and each item will be assigned a space within the proper category. Optional fields can include (1) material, such as 80% cotton, 20% polyester, (2) color, (3) year bought, (4) size, (5) length, (6) style, (7) weight, (8) thickness, (9) cleaning instructions, etc.

In a preferred embodiment, each article of clothing is represented on the computer as a small icon, which is an actual photo of the article. When the database is not extremely large, each person's clothes can be displayed on a single screen. As the size of the database increases, the user can choose to display the items by category, such as shirts, slacks, etc. The user can choose items by touching the icon on the screen. Additionally, a picture of each person in the database becomes the icon for that person; icons for categories, such a pants and shirts can also be created, making this a simple system to access, even for children and the elderly. If the user prefers they can also use a mouse to indicate choices.

For blind users, or any others who are unable to use the computer screen, an optional voice recognition system can be interfaced to the inventive storage unit. Simple commands like "get" and "put" are then stored in the system, as well as descriptors for each item of clothing. These descriptors can be as simple or complex as necessary for the amount of clothing in the storage unit. "White blouse" is sufficient if there is only one white blouse; "white silk blouse" provides for more than one while blouse; and "white silk blouse with long sleeves and mandarin collar" narrows the selection still further.

Of course, this illustrative example is only an exemplary use of the database of the invention, which can be organized in other manners that complement the user's needs. For example, a large theater company can use the inventive storage unit to organize a large number of costumes. Rather than assigning clothing to a person or role, the clothing can be organized by categories such as time period of the clothing, sex of the wearer, adult/child, etc.

In addition to the clothing database, monitoring software continually runs in the background on the system. The actions of this monitoring software are discussed below.

Figure 3:
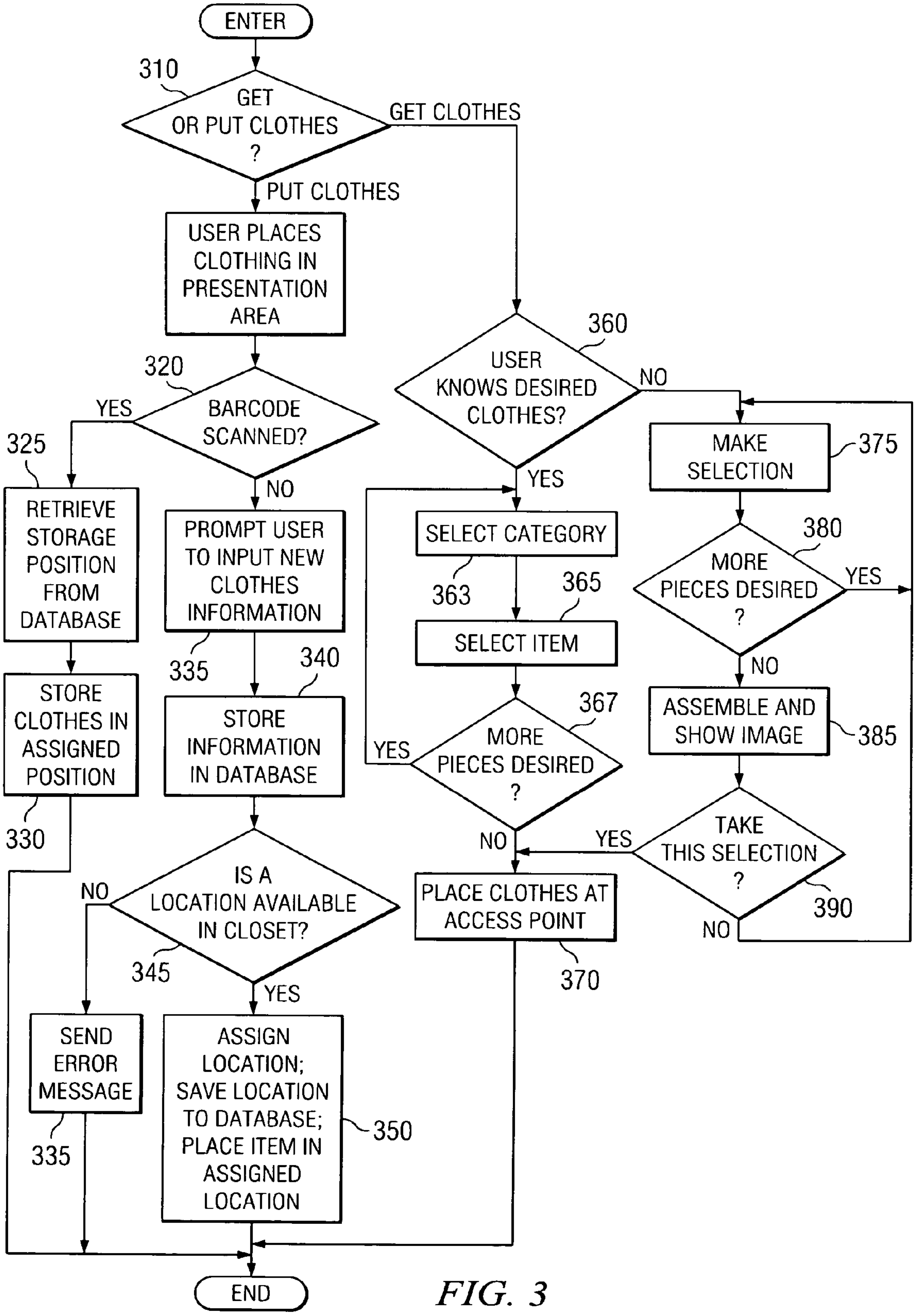
FIGS. 3 and 3A disclose a flowchart of the actions taken by the smart storage unit.

With reference now to FIG. 3, a flowchart of the actions taken by the smart storage unit are disclosed. When a user enters the flow, the computer will prompt them to choose to either place clothes in the storage unit or remove clothes from the storage unit (step 310). If the user is placing clothes in the storage unit, the clothes can already be in the database or they may need to be added to the database. The system prompts the user to place the clothes in the presentation area (step 315) and either scan the barcode for the existing clothes or indicate that this is a new article of clothing (step 320). If the user scans an existing barcode, the system will check the database to find the assigned storage position for the article of clothing (step 325), then the article will be removed from the presentation area and stored in the proper location by the action of the manipulator (step 330). If the clothes are new, the system will prompt the user to input information about the article of clothing and to take the necessary photos (step 335).

Figure 3A:
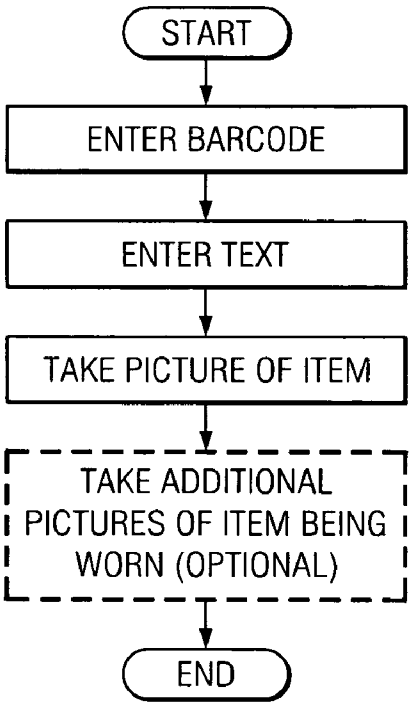

The step of adding information to the database is expanded in FIG. 3A. The first step is to tie the article to a barcode recognizable by the system (step 336). Many articles of retail commerce in the U.S. are sold with barcode attached to either the article or its packaging. For clothing, a removable hang tag generally contains this information. Since the barcode needs to be permanently associated with the item, a permanent barcode needs to be attached to the item.

In a preferred embodiment, the temporary barcode is scanned and printed to a special barcode machine that prints the barcode on a cloth tag that can be ironed on to the item, attached by a small pin, etc. Such a tag can preferably survive a trip to the dry-cleaners or laundry, as it is intended to remain with the item. Once the permanent barcode is attached, the user is prompted to enter the required fields mentioned above and any optional fields the user desires (step 337). The system then prompts the user to take a picture of the item using the attached camera (step 338). This picture will become the icon that represents the item in the system.

Finally, the system will prompt the user to take any additional photos it deems necessary (step 339). Any additional photos are used by the system to visually show an ensemble of separate pieces as they might appear when worn; the number and type of additional photos is determined by the category of the item. For accessories, it is generally unnecessary to provide additional photos; for a dress or coat, one additional photo will suffice; for separates, such as shirts, pants, and skirts, two photos can be used if either the item itself or what it is worn with could be worn either tucked in or left out.

Returning again to FIG. 3, once the information and photos are entered, they will be stored in the database for use as needed (step 340). The system next determines whether there is a location available in the proper area of the storage unit (step 345). If the system finds an available location in the proper category, the new item can be assigned to this location and then carried to the assigned location by the manipulator (step 350). If no location is available, an error message will be sent to the user (step 355) and the process will be terminated until the user determines how they wish to handle the problem. The user can choose to remove an existing article from the storage unit to make space for the new item or to simply reallocate space from a category that has available space.

If, instead of placing clothing into the storage unit, the user is retrieving clothes from the storage unit, the system presents two modes for retrieving clothing (step 360): a first if the user knows what they want to wear, a second if they want to have the computer assemble possible outfits for preview. If the user knows what they want to wear, the system prompts them to select first a category (blouse, skirt, etc.) (step 363), then to select an item in that category, using the displayed icons (step 365). In the presently preferred embodiment, the system keeps track of which items are currently present in the storage unit and which have been removed and not replaced. Preferably, the display of these items is visibly altered to show that they are not immediately available.

For example, the icon can be shown with a notation across or under the item noting its absence from the storage unit. Alternatively, the icon can be displayed in an altered manner, such as fogged or darkened to indicate its absence. In this manner, the user is able to ascertain immediately whether an item is available to wear and will not select an unavailable item.

The system will then check whether additional items will be selected (step 367), in which case the selection of category and item is repeated. The manipulator is then dispatched to retrieve the selected items from storage in the storage unit and place them in the presentation area for the user (step 370). If in step 360 the user is not certain what clothes they desire, the system enters a second, browsing mode. When the user selects an item (step 375), the system does not immediately retrieve the item, rather the user is prompted whether additional pieces are desired (step 380).

Once no more pieces are requested, the system assembles the various photos and provides a composite image so that the user can visualize the combination of garments (step 385). This composite image is created by the system using a cut-and-paste method, i.e., a cutout picture of the user in slacks overlies a picture of the user wearing a tucked in blouse. The system will work from an inside out approach, such that for a man in business suit, the layering will be done in the order of shirt, pants, tie, vest, and jacket, so that the pants overlie the shirt, the vest overlies the shirt and pants, etc.

The system then asks the user if the selected combination is acceptable (step 390). If the combination is acceptable, the items are retrieved and placed at the presentation point (step 370). Otherwise, the user can return to select new items for combination. Only when the user is satisfied will the system retrieve the desired articles of clothing. In this manner, the user can visualize combinations of clothing without having to have the pieces in front of them.

Figure 4:
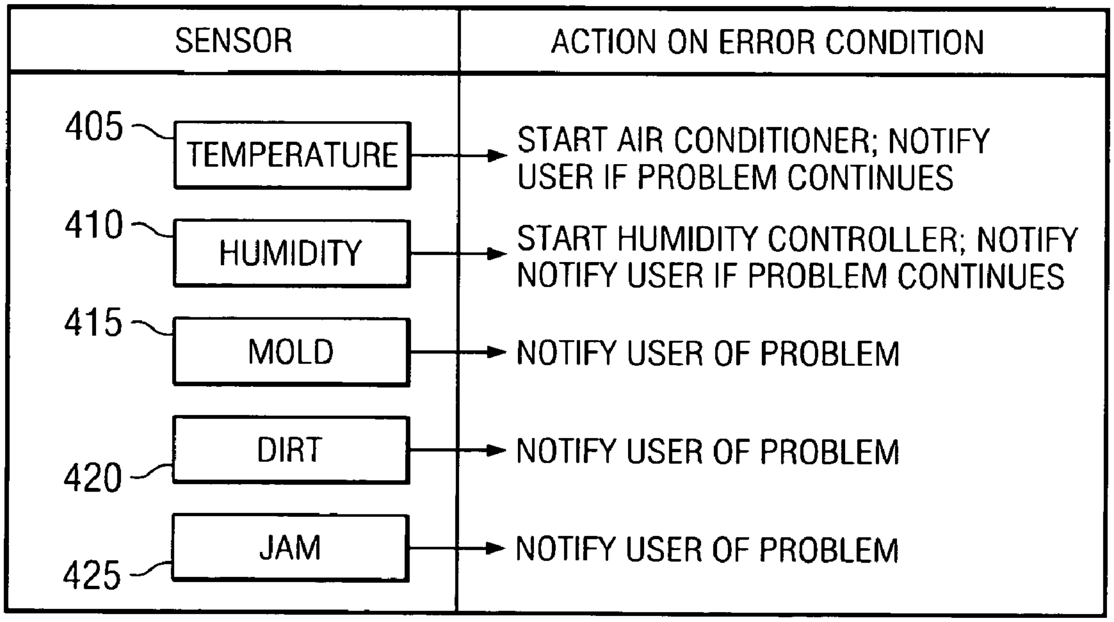
FIG. 4 schematically shows the conditions that are monitored and the responses that are made if the sensors detect an out of range condition.

In addition to the software described for placing and retrieving clothing, the automatic storage unit also has another program running in the background at all times to monitor the condition of the storage unit. With reference now to FIG. 4, this figure schematically shows the conditions that are monitored and the responses that are made if the sensors detect an out of range condition, in accordance with a preferred embodiment of the present invention. In the presently preferred embodiment, the sensors 142 in storage unit 100 include temperature 405, humidity 410, mold 415, dirt 420, and jam 425. The system is initiated with default parameters that specify the permissible values for the sensor readings, but the user can override these values.

If the values in the storage unit go outside of the given parameters, the system contains pre-programmed responses. If the temperature 405 goes out of range, the system will start the air conditioner, which will usually resolve the problem. If, however, the problem persists, the system can notify the user with a message and, if desired, an audible signal. If humidity sensor 410 detects a humidity level that is not acceptable, the humidity controller is started; again, if the problem persists, the user is notified. The remaining sensors, for mold 415, dirt 420, and jams 425, generally require user input to resolve the problem. If these conditions are noted, the user is notified of the problem. In the depicted embodiment, the user can indicate to the system the manner in which they wish to be notified of the problem. For example, the software can simply turn on a light to notify the user of a problem, or it can place a call to the user with a preprogrammed message. Other methods can also be used for notification, such as pager or fax.

The disclosed automatic storage unit provides convenience to the user and eliminates many of the problems discussed in the introduction. The user can visualize clothing without having to physically remove items from the storage unit until necessary. By having the software available on a remote computer, a user can contact the storage unit from a remote computer and have suitable clothing out and ready when they return home. Using the optional voice recognition/voice synthesis programs, a blind person or child can be prompted to make selections without keyboard entry. The clothes are kept in an ideal, monitored environment It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. For example, the mechanism of the present invention ay b applied to any type of storage unit for clothes in addition to a closet, such as an armoire. Also, the illustrative examples identify clothing and other articles through the use of bar codes. Other identification and tracking systems may be used in addition to or in place of a barcode system. For example, rather than barcodes, an inventive system could use other means of identification, such as smart tags that are responsive to radio waves. If a means of embedding the identification into the articles of clothing is developed, such as means can be incorporated into the disclosed invention. The embodiment was chosen and described in order to best explain the principles of the invention, the practical application, and to enable others of ordinary skill in the art to understand the invention for various embodiments with various modifications as are suited to the particular use contemplated.

What is claimed is:

1. An automatic storage unit comprising:

a storage area having assigned locations for a plurality of stored items;

a manipulator traveling on a manipulator track, said manipulator connected to carry ones of the plurality of stored items between said assigned locations and a presentation area;

a processor connected to control said manipulator; and a program running on said processor to receive input from a user regarding placement and retrieval of items in said storage area;

a computer storage device for storing a textual description and a plurality of digital photographs of each one of said plurality of stored items;

wherein said program provides a first mode in which a particular photograph of a first one of said stored items and a particular photograph of a second one of said stored items are combined to produce a composite photograph of said first one and said second one of said stored items that is displayed on a screen prior to selecting said first and said second one of said stored items together for retrieval and a second mode in which ones of said stored items are selected for retrieval without combining photographs of said ones of said stored items.

2. The automatic storage unit of claim 1, further comprising sensors located in said storage area and connected to said processor to notify a user when given parameters go out of a desired range, wherein said sensors are taken from the group consisting of temperature sensor, humidity sensor, jam sensor, mold sensor, and dirt sensor.

3. The automatic storage unit of claim 1, further comprising:

said plurality of stored items including clothing;

said storage area divided into zones according to clothing categories; and said categories including type of material, color, age, size, length, style, weight, thickness, and cleaning instructions.

4. The automatic storage unit of claim 1, further comprising:

said program receiving an input from a user that indicates that the user wants to store a new item in the storage area, the new item having a barcode that is temporarily attached to said new item;

means for scanning the barcode;

a barcode machine for printing the barcode on a cloth tag that can be ironed onto the new item to permanently attach said barcode to said new item; and said program prompting said user to take a plurality of digital photographs of the new item.

5. The automatic storage unit of claim 1, further comprising a connection to the Internet, wherein said program running on said processor can be remotely accessed.

6. The automatic storage unit of claim 1, wherein in said first mode, said processor perform a cut-and-paste operation to display the composite photograph, said composite photograph including only a portion of the particular photograph of the first one of said stored items and only a portion of the particular photograph of the second one of said stored items.

7. The automatic storage unit of claim 1, wherein said manipulator has two parts: a first part for carrying hanging clothing and a second part for carrying items to be stored on a shelf.

8. The automatic storage unit of claim 1, wherein said manipulator track terminates in a presentation area where clothes can be placed by said manipulator for retrieval by the user.

9. The automatic storage unit of claim 1, further comprising a barcode reader by which barcodes identifying ones of said stored items can be read.

10. The automatic storage unit of claim 1, further comprising a barcode writer by which barcodes identifying ones of said stored items are written.

11. The automatic storage unit of claim 1, further comprising a smart tag reader by which smart tags identifying ones of said stored items are read.

12. A method of managing a storage area, said method comprising:

moving items into and out of assigned locations in a storage area using a manipulator running on a manipulator track;

controlling the movement of said manipulator using a program running on a processor to receive input from a user regarding placement and retrieval of items in said storage area;

in a first mode, presenting a composite picture of a first one of the items and a second one of the items on a screen to allow the user to visualize the first and second items together prior to making a selection of items; and in a second mode, retrieving items from their icons presented on a menu, without presenting a composite picture.

13. The method of claim 12, further comprising sensing given conditions inside said storage area and notifying the user when said given conditions go out of a desired range.

14. The method of claim 13, wherein said sensors are connected to sense at least one of temperature, humidity, jamming of said manipulator, mold, and dirt.

15. The method of claim 13, wherein said processor notifies the user using a mode chosen from the group consisting of a) turning on a light, b) placing a phone call, c) sending a fax, and d) sending a message to a pager.

16. The method of claim 12, further comprising a connection to the Internet, wherein said program running on said processor can be remotely accessed.

17. The method of claim 12, wherein in said first mode, said processor performs a cut-and-paste operation in order to display said first one of said stored items and said second one of said stored items together and in a second mode, said processor retrieves items without displaying them together.

18. The method of claim 12, wherein said manipulator has a first part for carrying hanging clothing and a second part for carrying items to be stored on a shelf.

19. The method of claim 12, wherein said manipulator places retrieved items in a presentation area accessible to the user.

20. The method of claim 12, further comprising using a barcode reader to identify ones of said stored items.

21. The method of claim 12, further comprising using a barcode writer produce barcodes identifying ones of said stored items.

22. A computer program on a method of managing a storage area, said method comprising:

first instructions for receiving input from a user regarding placement and retrieval of items in a storage area;

second instructions for controlling a manipulator running on a manipulator track for moving the items into and out of assigned locations in said storage area;

third instructions for presenting two modes of retrieving items, wherein in a first mode, first and second items are presented in a composite picture to allow the user to visualize the first and second items together prior to making a selection of items; and in a second mode, items are retrieved from their icons presented on a menu, without presenting a composite picture.

23. The method of claim 22, further comprising fourth instructions for sensing given conditions inside said storage area and notifying the user when said given conditions go out of a desired range.

24. The method of claim 23, wherein said processor notifies the user using a mode chosen from the group consisting of a) turning on a light, b) placing a phone call, c) sending a fax, and d) sending a message to a pager.

25. The method of claim 22, further comprising fifth instructions for, in said first mode, performing a cut-and-paste operation in order to display a first items and a second stored item together.

26. The method of claim 22, wherein said second instructions control a first part of said manipulator for carrying hanging clothing and a second part of said manipulator for carrying items to be stored on a shelf.

27. The method of claim 22, further comprising sixth instruction causing said manipulator to place retrieved items in a presentation area accessible to the user.

28. The method of claim 22, further comprising seventh instructions controlling a barcode reader to identify ones of said items.

29. The method of claim 22, further comprising eighth instructions controlling a barcode writer to produce barcodes identifying ones of said stored items.

* * * * *